(12) United States Patent
Roberts et al.

(10) Patent No.: US 8,683,349 B2
(45) Date of Patent: Mar. 25, 2014

(54) MEDIA CONTENT USER INTERFACE SYSTEMS AND METHODS

(75) Inventors: Brian F. Roberts, Dallas, TX (US); Sok Y. Hwang, Dallas, TX (US); Raul I. Aldrey, Plano, TX (US); Donald H. Relyea, Dallas, TX (US); Kristopher T. Frazier, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 385 days.

(21) Appl. No.: 12/983,064

(22) Filed: Dec. 31, 2010

(65) Prior Publication Data

US 2012/0173991 A1 Jul. 5, 2012

(51) Int. Cl.
*G06F 3/00* (2006.01)

(52) U.S. Cl.
USPC ............................................. 715/747

(58) Field of Classification Search
USPC ............................................. 715/747
See application file for complete search history.

(56) References Cited

U.S. PATENT DOCUMENTS

| | | | |
|---|---|---|---|
| 5,861,885 A * | 1/1999 | Strasnick et al. | 715/850 |
| 6,414,677 B1 * | 7/2002 | Robertson et al. | 345/419 |
| 6,628,307 B1 * | 9/2003 | Fair | 715/763 |
| 6,924,822 B2 * | 8/2005 | Card et al. | 345/660 |
| 7,249,327 B2 * | 7/2007 | Nelson et al. | 715/782 |
| 7,467,356 B2 * | 12/2008 | Gettman et al. | 715/850 |
| 7,512,902 B2 * | 3/2009 | Robertson et al. | 715/848 |
| 7,583,265 B2 * | 9/2009 | Shiraishi et al. | 345/427 |
| 7,712,052 B2 * | 5/2010 | Szeliski et al. | 715/854 |
| 8,095,892 B2 * | 1/2012 | Anthony et al. | 715/851 |
| 8,230,359 B2 * | 7/2012 | Robertson et al. | 715/801 |
| 8,316,450 B2 * | 11/2012 | Robinson et al. | 726/26 |
| 2003/0081010 A1 * | 5/2003 | An Chang et al. | 345/835 |
| 2009/0216639 A1 * | 8/2009 | Kapczynski et al. | 705/14 |

OTHER PUBLICATIONS

ExAR System, Jul. 31, 2010, http://vc.inf.h-bonn-rhein-sieg.de/?page_id=445, p. 1.*

* cited by examiner

*Primary Examiner* — Stephen Hong
*Assistant Examiner* — James G Pohlman

(57) ABSTRACT

Exemplary media content user interface systems and methods are disclosed herein. An exemplary method includes a media content access subsystem displaying a plurality of display elements topographically distributed throughout a graphical representation of a virtual world in accordance with one or more distribution heuristics, detecting a user interaction, and dynamically adjusting the topographical distribution of the one or more display elements in accordance with the user interaction. Corresponding systems and methods are also disclosed.

25 Claims, 8 Drawing Sheets

MEDIA CONTENT USER INTERFACE SYSTEMS AND METHODS

BACKGROUND INFORMATION

Advances in electronic communications technologies have facilitated widespread distribution of media content. To illustrate, personal computers, handheld devices, mobile phones, set-top box devices, and other media content access devices are increasingly being used to access, store, download, share, and/or otherwise process various types of media content (e.g., video, audio, photographs, and/or multimedia).

In some instances, these media content access devices present one or more media content user interfaces to facilitate a user's access to media content. Unfortunately, however, traditional media content user interfaces can be rigid and unintuitive as well as lack customization or personalization. For example, many traditional media content user interfaces have a grid-like format that limits what is displayed, how it is displayed, where it is displayed, and how content is discovered by a user. In addition, many traditional media content user interfaces are standardized and do not take into account differing preferences between users or a user's own changing preferences, traits, and moods. As a result, the process of browsing traditional media content user interfaces may seem constricted, unintuitive, and/or impersonal for users.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
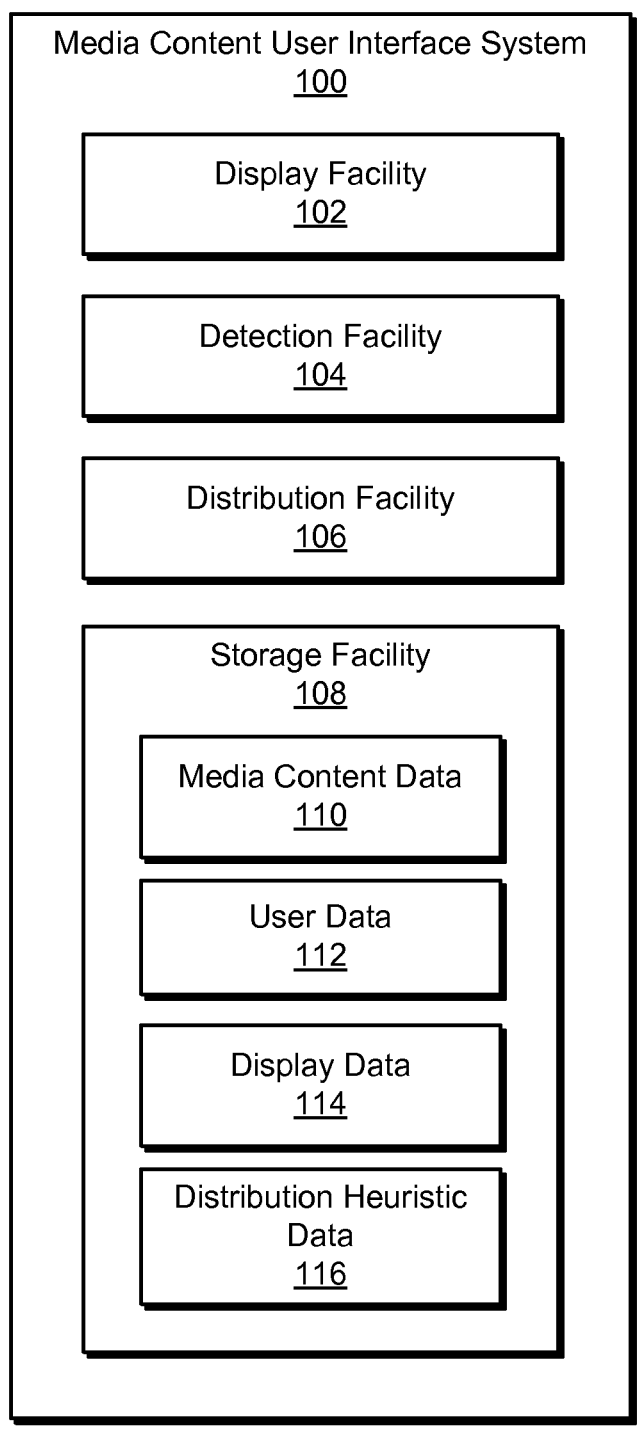
FIG. 1 illustrates an exemplary media content user interface system according to principles described herein.

Exemplary media content user interface systems and methods are disclosed herein. As will be described in more detail below, in certain implementations, the methods and systems disclosed herein may be configured to provide a user with a media content interface including an immersive virtual environment through which the user can navigate and discover media content. In some examples, the methods and systems disclosed herein may be configured to provide a customized media content user interface to a user through which media content is made available in a way that is unique to the user and/or in accordance with the user's unique user profile, preferences, interactions, and/or desires. Additionally or alternatively, the methods and systems disclosed herein may be self-learning over time and may be configured to dynamically adjust a user's media content user interface in accordance with the user's changing preferences, traits, and/or moods. Additional benefits and/or advantages will be apparent from the details disclosed herein.

The exemplary media content user interface systems and methods described herein may provide for a display, within a graphical user interface, of a graphical representation of a virtual world. A plurality of display elements representative of a plurality of media content instances may be topographically distributed throughout the graphical representation of the virtual world in accordance with one or more distribution heuristics to form one or more topographical shapes and/or features within the graphical representation of the virtual world. In some examples, the topographical distribution of the display elements may be dynamically adjusted in accordance with one or more user interactions. Such dynamic adjustment of the topographical distribution of the display elements may modify the one or more topographical shapes and/or features within the graphical representation of the virtual world formed by the display elements.

As used herein, the terms "topographical distribution" and "topographically distributed" refer to any suitable positioning, organization, allocation, grouping, movement, and/or arrangement of display elements in a way that forms (e.g., forms, creates, simulates, etc.) one or more topographical features within a graphical representation of a virtual world. For example, each display element may be selectively positioned within the graphical representation of the virtual world such that the display elements collectively form one or more topographical features of the virtual world. To illustrate, each display element may be positioned within a particular area of a virtual world, within a particular group of display elements within a virtual world (e.g., within a group of display elements visually depicting a colonization of similar media content), at a particular position (e.g., a geographic position in accordance with one or more geographic coordinates) within a virtual world, at a particular altitude or height within a virtual world, at any other suitable position, and/or in any other suitable manner such that the display elements collectively form one or more topographical features. Hence, a topographical feature of the virtual world may be formed by a group of one or more display elements.

As used herein, the term "topographical feature" may refer to any suitable topographical shape, terrain, structure, surface, and/or other feature of a virtual world. In some examples, a topographical feature may be similar to one or more topographical features of a physical planet (e.g., Earth). To illustrate, an exemplary topographical feature may include and/or be similar to one or more mountains, mountain ranges, hills, valleys, buildings, cities, colonies, trees, forests, landmasses (e.g., islands, continents, etc.), and/or any other suitable topographical features.

In some examples, a topographical distribution may be at least partially dynamic. For example, at least one display element within a topographical distribution may be dynamically repositioned and/or a corresponding topographical shape/feature may be dynamically altered in any suitable manner. In some examples, the topographical distribution may be dynamically adjusted in accordance with one or more user preferences, traits, and/or interactions to facilitate the user's discovery of media content in a personalized and/or customized manner, as will be explained in more detail below.

As used herein, the term "media content user interface" may refer generally to any user interface configured to allow a user to browse, discover, and/or access media content and/or associated information. For example, a media content user interface may include a graphical user interface by way of which a user may discover, access, and/or experience media content. Exemplary media content user interfaces are described herein.

As used herein, "media content" may refer generally to any content accessible via a media content access subsystem. The term "media content instance" will be used herein to refer to any television program, on-demand media program, pay-per-view media program, broadcast media program (e.g., broadcast television program), IPTV media content, advertisement (e.g., commercial), video, movie, song, image, photograph, sound, or any segment, component, or combination of these or other forms of media content that may be viewed or otherwise experienced by a user.

As used herein, the term "media content characteristic" or "characteristic" may refer generally to any characteristic or attribute associated with a media content instance. The characteristics of a media content instance may provide valuable information that may be utilized to provide customized/personalized media content user interfaces and/or recommendations for a user. For example, a media content characteristic may include a genre, a person (e.g., a particular actor, artist, etc.), a time (e.g., a release time, a time during which the media content instance is available, etc.), a quality (e.g., a video, audio, or image quality), a size, a mood, a location, a format, and/or any other suitable characteristic. To illustrate, exemplary characteristics of a song may include a title of the song, a name of the song's artist or composer, a name of the song's album, a genre of the song, a length of the song, a rating of the song, an instrumentation of the song, a structural composition of the song, an audio quality of the song, a rhythm of the song, lyrical content of the song, a tonality of the song, and/or any other characteristic corresponding to the song. Exemplary characteristics of a video (e.g., a television program, a film, a home movie, etc.) may include a title of the video, a name of one or more actors, directors, and/or producers associated with the video, a rating of the video (e.g., a user rating, a critic rating, etc.), a synopsis of the video, a genre of the video, a setting of the video, a theme of the video, a format of the video, a quality of the video, a resolution of the video, a size of the video, a time or date associated with the video (e.g., time or date of production, time or date of release, etc.), a color content of the video, a frame rate of the video, a bit rate of the video, an aspect ratio of the video, a compression of the video, a codec associated with the video, and/or any other suitable characteristic of the video. Exemplary characteristics of an image (e.g., a photograph) may include a description of the image, a location associated with the image, a name of one or more persons appearing in the image, a name of a photographer associated with the image, a size of the image, a format of the image, a quality of the image, a resolution of the image, a color content of the image, and/or any other suitable characteristic of the image. In additional or alternative examples, a media content instance may include and/or be associated with any other suitable characteristics.

As used herein, the term "user profile" may refer to any suitable information associated with a user. For example, a user profile may include a set of data representing information associated with a user's personal traits, preferences, settings, age, gender, income level, profession, family status, nationality, preferred genre of media content, media content viewing tendencies, etc.

As used herein, the term "social media contact" may refer generally to any person (e.g., family member, friend, colleague, an individual having shared interests with a user, and/or any other suitable person) linked to a user by way of one or more social media outlets (e.g., Twitter, Facebook, Myspace, Wikipedia, YouTube, and/or any other suitable system, network, and/or outlet configured to facilitate interaction and/or the distribution of communications and/or content between one or more users). To illustrate, a social media contact may include a Facebook friend, a Twitter follower, a YouTube subscriber, and/or any other suitable social media contact.

As used herein, the term "display element" refers to text (e.g., one or more words, characters, numbers, symbols, etc.), one or more images, one or more videos, one or more graphics, animation content (e.g., Flash content), one or more hyperlinks, and/or any other content that may be visually displayed in a media content user interface and that may be representative of a media content instance. In some examples, a display element representative of a particular media content instance may include a thumbnail image associated with the particular media content instance (e.g., a thumbnail image of a photograph, of album cover artwork, and/or of a frame of a video).

Exemplary media content user interface systems and methods will now be described in reference to the drawings.

FIG. 1 illustrates an exemplary media content user interface system 100 (or simply "system 100"). As will be described in more detail below, system 100 may be configured to provide a media content user interface configured to facilitate a user's navigation and/or discovery of media content in a personalized and/or customized manner.

System 100 may include, but is not limited to, a display facility 102, a detection facility 104, a distribution facility 106, and a storage facility 108, which may be in communication with one another using any suitable communication technologies. It will be recognized that although facilities 102-108 are shown to be separate facilities in FIG. 1, any of facilities 102-108 may be combined into fewer facilities, such as into a single facility, or divided into more facilities as may serve a particular implementation.

Display facility 102 may be configured to generate, manage, and/or provide a media content user interface for presentation to and/or interaction by a user. In some examples, the media content user interface may include a virtual environment by way of which a user may navigate, discover, and/or access media content. In additional or alternative examples, the media content user interface may be customized and/or personalized for a particular user or group of users. To illustrate, display facility 102 may be configured to display, by way of a graphical user interface, a plurality of display elements (e.g., display elements representative of a plurality of media content instances) that are topographically distributed throughout a graphical representation of a virtual world (e.g., a virtual planet) in accordance with one or more distribution heuristics. In some examples, the virtual world may form and/or include a three-dimensional virtual environment that a user may interact with and/or navigate to discover and access available media content. Additionally or alternatively, the display elements may be distributed throughout the virtual world in a way that is appealing, intuitive, customized, and/or personalized to the user. Furthermore, the manner in which the display elements are distributed throughout the graphical representation of the virtual world may be dynamically adjusted in accordance with a user's preferences, moods, viewing tendencies, and/or interactions with the media content user interface, as will be explained in more detail below.

Detection facility 104 may be configured to detect one or more user interactions. For example, detection facility 104 may be configured to detect a user's interaction with a media content user interface (e.g., a media content user interface displayed by display facility 102), a particular media content instance (e.g., a user's viewing and/or rating of the particular media content instance), a media content access device (e.g., a set-top box device, a table computer, a mobile phone device, etc.), an input device (e.g., a touch screen, a remote control device, etc.), a display element (e.g., a display element displayed by display facility 102), and/or a social media outlet. In additional or alternative examples, detection facility 102 may be configured to detect any other suitable user interaction in any other suitable manner, as will be explained in more detail below.

Distribution facility 106 may be configured to manage the distribution of display elements (e.g., display elements representative of corresponding media content instances) within a media content user interface. For example, distribution facility 106 may be configured to manage and/or control the positions of display elements within a media content user interface, the heights of display elements within a media content user interface, the movement of display elements within a media content user interface, the grouping of display elements within a media content user interface, whether and when a particular display element is displayed within a media content user interface, and/or any other aspect associated with the display, position, and/or movement of display elements within a media content user interface. In some examples, distribution facility 106 may be further configured to manage and/or utilize one or more corresponding distribution heuristics.

In some examples, distribution facility 106 may be configured to dynamically adjust the distribution of display elements within a media content user interface. To illustrate, distribution facility 106 may be configured to dynamically adjust the movement and/or position of a particular display element and/or dynamically adjust the operation of a particular distribution heuristic in accordance with and/or in response to a user interaction and/or other information detected or obtained by detection facility 104, as will be explained in more detail below.

Storage facility 108 may be configured to maintain media content data 110 representative of one or more media content instances, user data 112 representative of information associated with one or more users (e.g., user profile information, user preferences information, user interaction information, social media contact information, etc.), user interface data 114 representative of one or more user interfaces including data representative of one or more display elements topographically distributed throughout a graphical representation of a virtual world, and distribution heuristic data 116 representative of one or more distribution heuristics configured to govern the distribution of one or more display elements through a virtual world displayed within a user interface. Storage facility 108 may be configured to maintain additional or alternative data as may serve a particular implementation.

Figure 2:
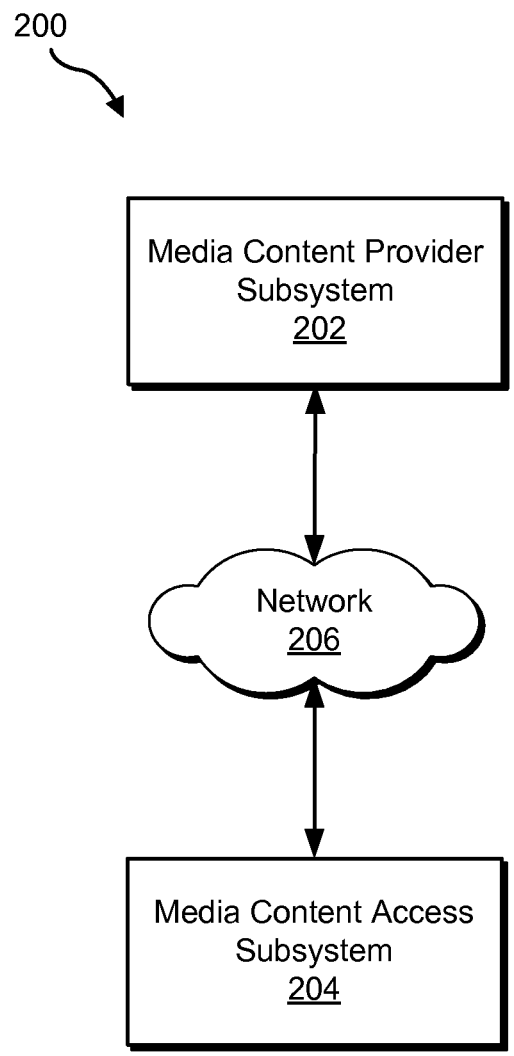
FIG. 2 illustrates an exemplary implementation of the system of FIG. 1 according to principles described herein.

FIG. 2 illustrates an exemplary implementation 200 of system 100 wherein a media content provider subsystem 202 (or simply "provider subsystem 202") is communicatively coupled to a media content access subsystem 204 (or simply "access subsystem 204"). As will be described in more detail below, display facility 102, detection facility 104, distribution facility 106, and storage facility 108 may each be implemented on one or both of provider subsystem 202 and access subsystem 204.

Provider subsystem 202 and access subsystem 204 may communicate using any communication platforms and technologies suitable for transporting data and/or communication signals, including known communication technologies, devices, media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, in-band and out-of-band signaling technologies, and other suitable communications networks and technologies.

In certain embodiments, provider subsystem 202 and access subsystem 204 may communicate via a network 206, which may include one or more networks, including, but not limited to, wireless networks (Wi-Fi networks), (e.g., wireless communication networks), mobile telephone networks (e.g., cellular telephone networks), closed media networks, open media networks, closed communication networks, open communication networks, satellite networks, navigation networks, broadband networks, narrowband networks, voice communication networks (e.g., VoIP networks), the Internet, local area networks, and any other networks capable of carrying data and/or communications signals between provider subsystem 202 and access subsystem 204. Communications between provider subsystem 202 and access subsystem 204 may be transported using any one of the above-listed networks, or any combination or sub-combination of the above-listed networks.

While FIG. 2 shows provider subsystem 202 and access subsystem 204 communicatively coupled via network 206, it will be recognized that provider subsystem 202 and access subsystem 204 may be configured to communicate one with another in any other suitable manner (e.g., via a direct connection).

Provider subsystem 202 may be configured to generate or otherwise provide media content (e.g., in the form of one or more media content streams including one or more media content instances) to access subsystem 204. In additional or alternative examples, provider subsystem 202 may be configured to provide a user with data representative of information and/or content associated with the user's social media contacts and/or corresponding social media outlets. Provider subsystem 202 may be further configured to provide access subsystem 204 with access to enhanced content (e.g., advertisements, promotional offers, games, interactive content, etc.).

Access subsystem 204 may be configured to facilitate access by a user to media content made available by provider subsystem 202. To this end, access subsystem 204 may present (e.g., by way of a display screen or display device associated with and/or included in access subsystem 204) a media content user interface to the user, present (e.g., display) a media content instance for experiencing (e.g., viewing) by the user, facilitate the recording of a media content instance for later playback by the user, and/or analyze data associated with media content (e.g., analyze characteristics and/or metadata associated with the media content) to personalize and/or customize the delivery of the media content to the user.

Provider subsystem 202 may be implemented by one or more computing devices. For example, provider subsystem 202 may be implemented by one or more server devices. Additionally or alternatively, access subsystem 204 may be implemented as may suit a particular implementation. For example, access subsystem 204 may be implemented by one or more media content access devices, which may include, but are not limited to, a set-top box device, a DVR device, a media content processing device, a communications device, a mobile access device (e.g., a mobile phone device, a handheld device, a laptop computer, a tablet computer, a personal-digital assistant device, a camera device, etc.), a personal computer, a gaming device, a television device, and/or any other device configured to perform one or more of the processes and/or operations described herein. In some examples, access subsystem 204 may include and/or be associated with any suitable input device (e.g., a touch screen, a mouse, a keyboard, a remote control device, etc.) configured to allow a user to interact with and provide user input to access subsystem 204.

In certain embodiments, system 100 may be implemented entirely by or within provider subsystem 202 or access subsystem 204. In other embodiments, components of system 100 may be distributed across provider subsystem 202 and access subsystem 204. For example, access subsystem 204 may include a client (e.g., a client application) implementing one or more of the facilities of system 100. To illustrate, display facility 102 may utilize access subsystem 204 to display a media content user interface to a user, detection facility 104 may be configured to detect one or more user interactions with access subsystem 204, and distribution facility 106 may be configured to dynamically adjust the distribution of the display elements within the displayed media content user interface in accordance with the detected user interactions.

Figure 4:
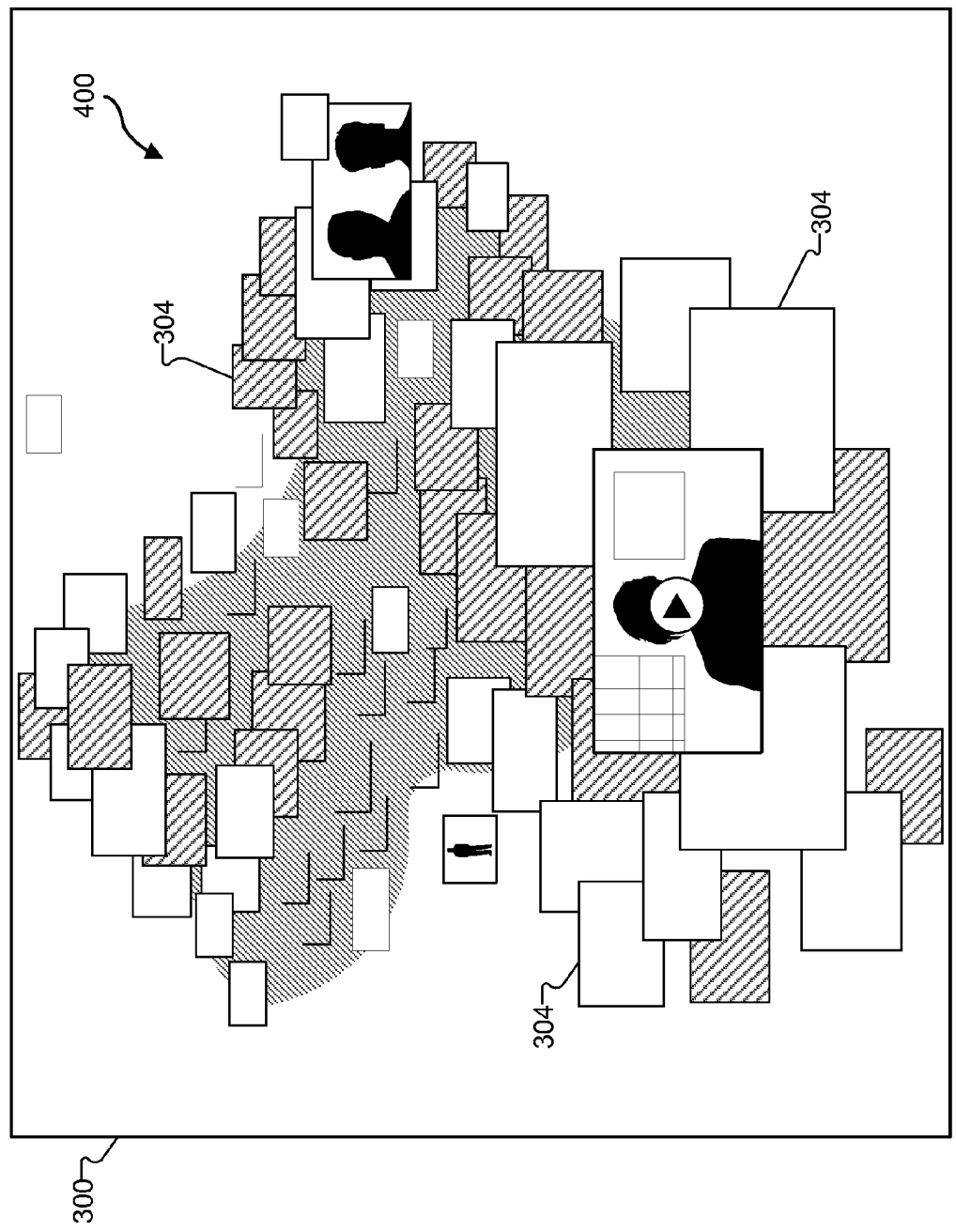
Figure 5:
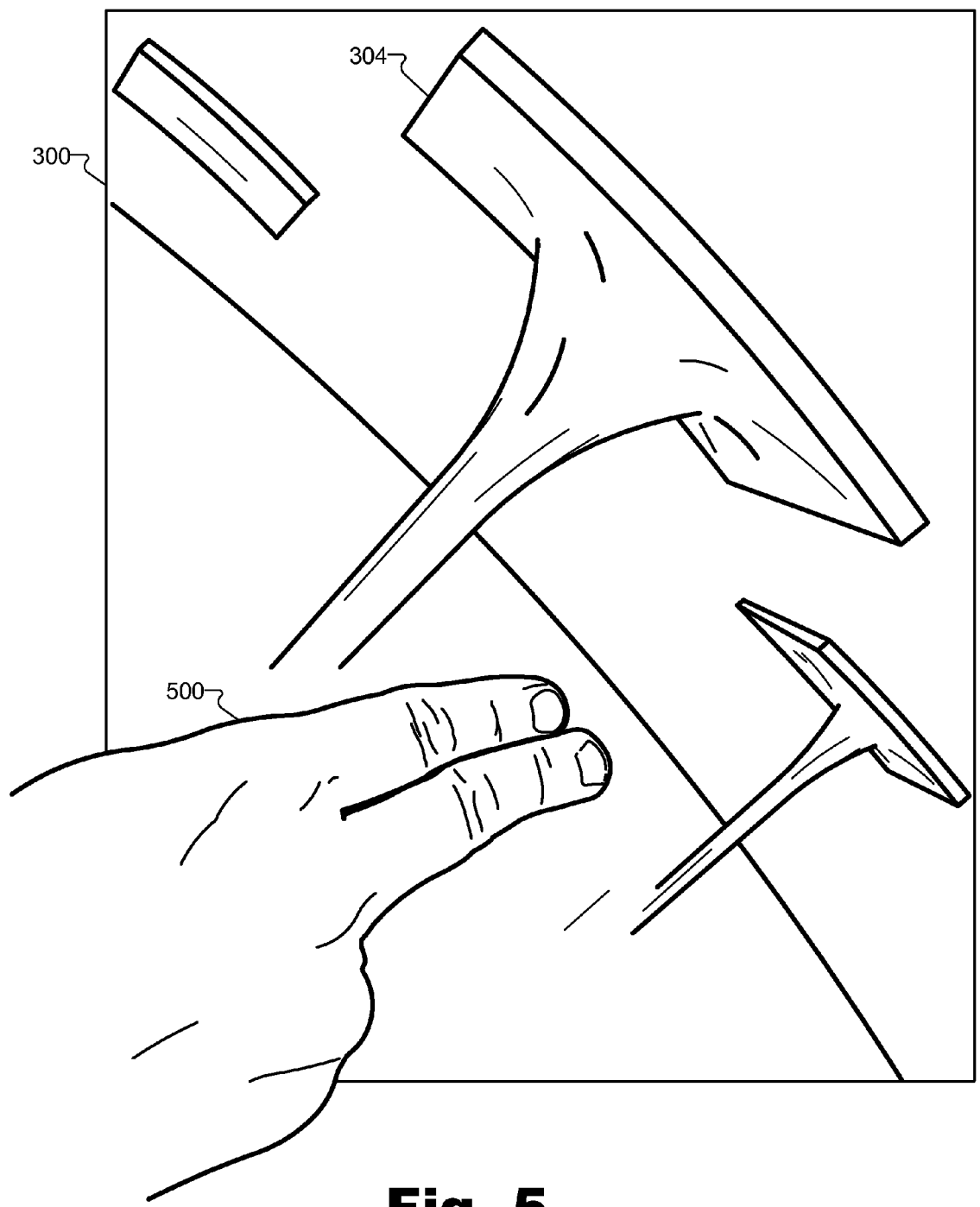

Facilities 102-108 of system 100 will now be described in more detail in conjunction with FIGS. 3-5, which illustrate exemplary views of a media content user interface in the form of a graphical user interface ("GUI") 300 that may be generated, managed, and/or provided by system 100. In some examples, GUI 300 may be displayed on a display screen associated with access subsystem 204. A user may interact with GUI 300 using any suitable input device associated with access subsystem 204. It will be recognized that GUI 300 and the exemplary views shown in FIGS. 3-5 are merely illustrative and that they may be modified, redacted, or added to in any way as may serve a particular implementation.

As mentioned above, display facility 102 may be configured to generate, manage, and/or provide a media content user interface. To illustrate, display facility 102 may be configured to generate, manage, display, and/or provide GUI 300 by way of a display screen associated with a media content access device. In some examples, GUI 300 may be configured to facilitate a user's navigation, discovery, and/or access of media content and/or corresponding information, as will be explained in more detail below. Display facility 102 may be configured to provide GUI 300 in any suitable manner as may serve a particular implementation.

Figure 3:
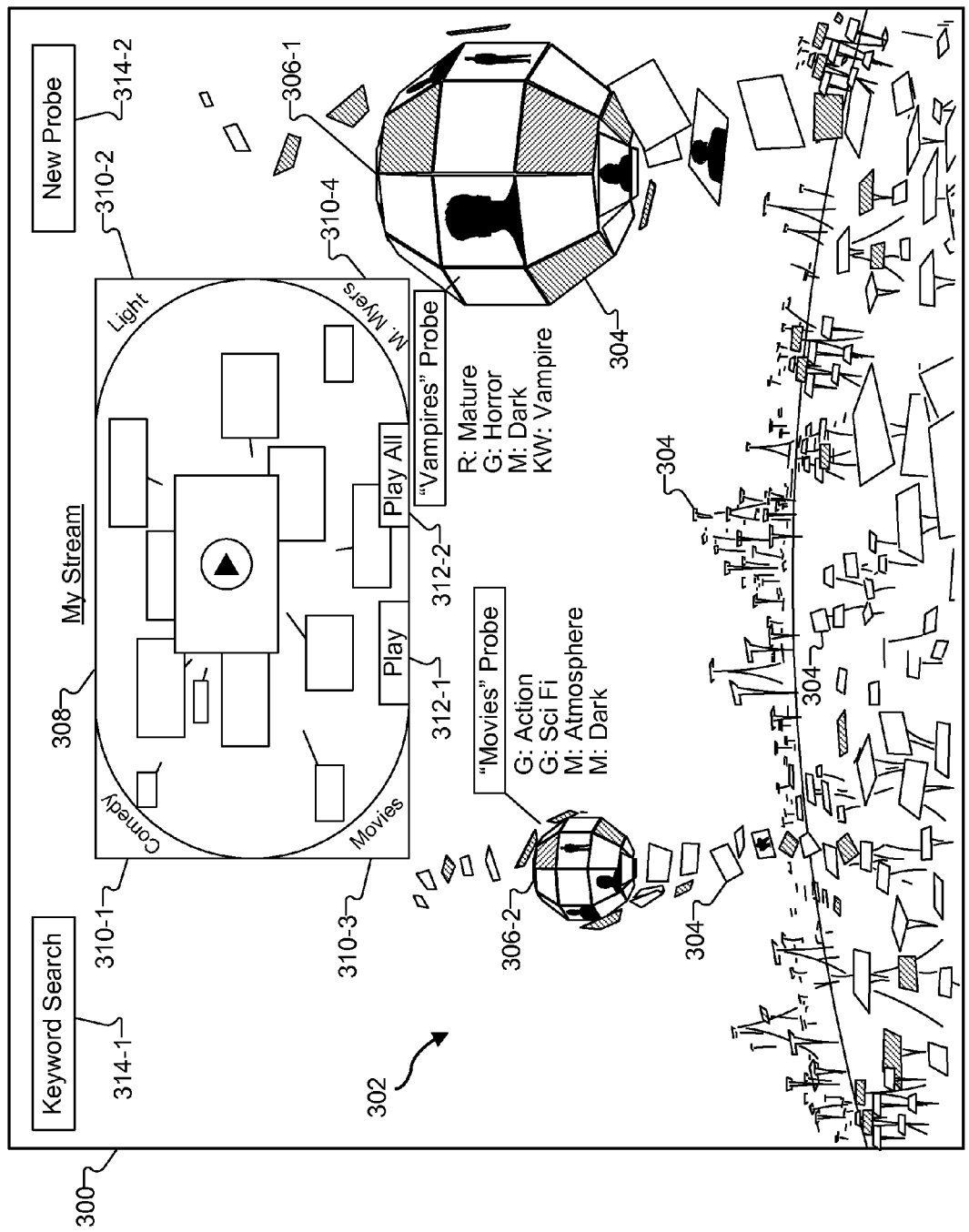
FIGS. 3-5 illustrate views of an exemplary media content user interface according to principles described herein.

As shown in FIG. 3, GUI 300 may include a graphical representation of a virtual world 302. In some examples, virtual world 302 may represent a virtual environment similar in appearance to a physical world. For example, virtual world 302 may have one or more characteristics that are similar to characteristics of the planet Earth. For example, virtual world 302 may include topography, terrain, structures, ecosystems (e.g., including plant and/or animal life), climates, weather, and/or any other suitable characteristics similar to those of the planet Earth. In additional or alternative examples, virtual world 302 may include elements and/or characteristics of any other physical and/or fictional worlds. In some examples, the appearance and/or configuration of virtual world 302 may be user configurable. For example, a user may selectively customize the look, feel, structure, appearance, and/or any other suitable attributes of virtual world 302.

Although a particular exemplary view of virtual world 302 is shown in FIG. 3, one will appreciate that virtual world 302 may extend beyond the view shown in FIG. 3. For example, virtual world 302 may extend in one or more directions beyond the view shown in FIG. 3. In some examples, virtual world 302 may be at least partially three-dimensional, thereby providing a user with a three-dimensional virtual environment that simultaneously extends in multiple directions from the view shown in FIG. 3. Additionally or alternatively, virtual world 302 may be one of a plurality of virtual worlds accessible by way of GUI 300 and/or associated with one or more users.

GUI 300 may be user navigable. For example, GUI 300 may be configured to allow a user to selectively navigate virtual world 302. To illustrate, display facility 102 may be configured to allow a user to alter the view shown in GUI 300 to move around virtual world 302, discover additional virtual worlds, access content available by way of virtual world 302, and/or navigate virtual world 302 in any other suitable manner. In some examples, a user may zoom the view of virtual world 302 presented by way of GUI 300 in and/or out, change a position of the perspective from which the view of virtual world 302 is taken, change an angular direction of the perspective from which the view of virtual world 302 is taken, and/or alter the view of virtual world 302 in any other suitable manner. GUI 300 may be further configured to allow a user navigating virtual world 302 to interact with and/or experience elements and/or content (e.g., media content) included within and/or available by way of virtual world 302, as will be explained in further detail below. GUI 300 may be configured for display on and/or in conjunction with a touch screen (e.g., a touch screen included within a mobile access device, such as a table computer). Accordingly, a user may utilize the touch screen to manually navigate virtual world 302 and/or interact with one or more elements of virtual world 302, as will be explained in more detail below.

As shown in FIG. 3, display facility 102 may be configured to display, by way of GUI 300, a plurality of display elements topographically distributed throughout virtual world 302 (an exemplary number of display elements are labeled within FIG. 3 with the reference numeral "304" and the display elements may be collectively and/or individually referred to herein as "display elements 304"). As shown in FIG. 3, display elements 304 may form at least a portion of virtual world 302. For example, as mentioned above, display elements 304 may form one or more topographical shapes, structures, and/or other features of virtual world 302. In additional or alternative examples, display elements 304 may be distributed and/or displayed in any other suitable manner. As will be explained in more detail below, the distribution of display elements 304 throughout virtual world 302 may be adjusted (e.g., by distribution facility 106) in any suitable manner as may serve a particular implementation (e.g., to customize and/or personalize the delivery and/or discovery of display elements 304).

Display elements 304 may include any suitable display elements, such as described herein. In some examples, each display element 304 may be representative of a corresponding media content instance that is available to and/or may be experienced by a user. Additionally or alternatively, one or more of display elements 304 may include thumbnail images (e.g., thumbnail images associated with corresponding media content instances). In some examples, display facility 102 may display a single display element 304 at different positions within virtual world 302 at different times and/or display duplicate display elements 304 (e.g., display elements 304 representative of the same media content instance) at different positions within virtual world 302 at the same time.

As mentioned above, display elements 304 may be distributed throughout virtual world 302 in accordance with one or more distribution heuristics. For example, the one or more distribution heuristics may be configured to control, govern, and/or manage when, where, and/or how display elements 304 are positioned, grouped, and/or moved throughout virtual world 302. To illustrate, the one or more distribution heuristics may govern a position of one or more display elements 304 within virtual world 302, an absolute altitude of one or more display elements 304 (e.g., relative to a common data reference) within virtual world 302, a relative altitude/position of one or more display elements 304 with respect to one or more other display elements 304, a grouping of one or more display elements 304 within virtual world 302, a movement of one or more display elements 304 within virtual world 302, when and which display elements 304 are positioned within a particular area (e.g., a geographic area) of virtual world 302, and/or any other suitable aspect of the distribution of display elements 304 within virtual world 302.

The one or more distribution heuristics may be based on and/or utilize any suitable information to govern the distribution of display elements 304. For example, the one or more distribution heuristics may be based on information associated with media content instances (e.g., information regarding the characteristics of the media content instances), information associated with a user (e.g., user profile information, the user's viewing history, the user's viewing queue, the user's schedule of recordings, a location of the user, etc.), information associated with a user's social media contacts (e.g., user profiles associated with the social media contacts, communications to/from the social media contacts, current and/or past activities of the social media contacts, preferences of the social media contacts, etc.), information associated with third parties (e.g., critic's ratings/reviews of media content instances), and/or any other suitable information.

In some examples, the one or more distribution heuristics may be configured to distribute (e.g., position, group, and/or move) display elements 304 throughout virtual world 302 to form one or more topographical features of virtual world 302. To illustrate, display elements 304 may be grouped to simulate a terrain (e.g., an elevation, slope, and/or orientation) of a surface of virtual world 302, one or more natural topographical features (e.g., mountains, hills, valleys, forests, landmasses—such as continents, islands, etc.—bodies of water, and/or any other suitable natural topographical features) of virtual world 302, one or more man-made topographical features (e.g., buildings, cities, roads, dams, and/or any other suitable man-made topographical features) of virtual world 302, and/or any other suitable topographical features of virtual world 302.

A distribution heuristic may specify one or more distribution conditions to be satisfied in order for a corresponding display element 304 to be distributed in accordance with the distribution heuristic. The one or more distribution conditions may include any suitable requirements associated with any suitable information. In some examples, an exemplary distribution heuristic may specify one or more distribution conditions associated with media content characteristics. For example, an exemplary distribution condition may require that a media content instance include and/or be associated with one or more specified characteristics before the distribution condition is satisfied. To illustrate, an exemplary distribution condition may require that a media content instance be associated with a particular genre (e.g., comedy) and/or include a particular actor (e.g., Julia Roberts) before the distribution condition is satisfied. In additional or alternative examples, an exemplary distribution heuristic may specify one or more distribution conditions associated with time. To illustrate, an exemplary distribution condition may specify a particular date (e.g., month, day, and/or year), time of day, and/or amount of time (e.g., an elapsed time) that must pass before the distribution condition is satisfied. In yet additional or alternative examples, an exemplary distribution heuristic may specify one or more distribution conditions associated with one or more social media outlets and/or social media contacts. To illustrate, an exemplary distribution condition may require that one or more of a user's social media contacts view and/or recommend (e.g., "like") a particular media content instance for the distribution condition to be satisfied. The foregoing examples are provided for illustrative purposes only and are not limiting. In further embodiments, a distribution heuristic may specify any suitable additional and/or alternative distribution conditions.

The one or more distribution heuristics may be defined/configured by any suitable party and/or at any suitable time. For example, an exemplary distribution heuristic may be predefined by a provider of system 100. Additionally or alternatively, the one or more distribution heuristics may be user defined. To illustrate, a user may selectively modify one or more existing distribution heuristics, create one or more additional distribution heuristics, and/or configure the one or more distribution heuristics in any other suitable manner.

In some examples, the one or more distribution heuristics may include at least one self-learning distribution heuristic. For example, a self-learning heuristic may be configured to dynamically adapt and learn based on user interactions, user inaction, and/or changes in a user's preferences, profile, traits, mood, etc., as will be explained in more detail below. Accordingly, the self-learning distribution heuristic may be able to dynamically govern the distribution of display elements 304 in a way that is personalized, customized, and/or intuitive to a user.

The one or more distribution heuristics may be selectively associated with each other. For example, a particular distribution heuristic may be independent of other distribution heuristics (e.g., the distribution heuristic does not require the satisfaction of other distribution heuristics) or may be dependent on one or more other distribution heuristics (e.g., the distribution heuristic requires the satisfaction of the one or more other distribution heuristics).

As mentioned above, display elements 304 may be grouped together within one or more areas of virtual world 302 and/or to form one or more topographical features of virtual world 302. For example, virtual world 302 may include one or more areas each including one or more display elements 304. The display elements 304 included within a particular area may be grouped (e.g., stacked, piled, arranged, etc.), thereby forming one or more topographical features within the particular area. To illustrate, a top view of an exemplary group 400 of display elements 304 is shown in FIG. 4. As shown in FIG. 4, group 400 may include a pile of display elements 400 that may be positioned in any suitable area of virtual world 302 and/or may be grouped together and/or organized in any suitable manner, such as will be explained in more detail below.

Referring again to FIG. 3, each area of virtual world 302 and/or corresponding group of display elements 304 may be associated with one or more distribution heuristics. As a result, each area of virtual world 302 and/or group of display elements 304 may include display elements 304 representative of media content instances having one or more similarities with each other (e.g., media content instances associated with one or more common media content characteristics). To illustrate, a first area of virtual world 302 and/or group of display elements 304 may be associated with and include display elements 304 representative of media content instances that are specifically recommended for the user (e.g., based on the user's preferences, viewing tendencies, ratings, etc.), a second area of virtual world 302 and/or group of display elements 304 may include display elements 304 representative of media content instances that are currently "hot" or popular (e.g., based on viewing statistics and/or ratings) among the general public or within a particular group of users, a third area of virtual world 302 and/or group of display elements 304 may include display elements 304 representative of media content instances associated with a particular genre (e.g., action), and a fourth area of virtual world 302 and/or group of display elements 304 may include display elements 304 representative of media content instances that have recently been viewed, are currently being viewed, and/or have been recommended by one or more of the user's social media contacts. Accordingly, a user may selectively navigate between different areas of virtual world 302 and/or groups of display elements 304 to discover and/or access corresponding media content instances.

In additional or alternative examples, display elements 304 included within a particular area of virtual world 302 and/or group of display elements 304 may be distributed (e.g., positioned, organized, stacked, piled, grouped, arranged, etc.) relative to each other to further refine the distribution of display elements 304 and/or customized the discovery and/or access of corresponding media content. For example, one or more distribution heuristics may be configured to distribute display elements 304 within a particular group of display elements 304 based on one or more media content characteristics. To illustrate, display elements 304 within a particular group and/or corresponding media content instances may be ranked based on a relevance (e.g., a relevance to one or more user preferences, a relevance to one or more specified media content characteristics, etc.) of each display element 304/media content instance, a popularity of each display element 304/media content instance, a rating (e.g., based on user ratings and/or critic's ratings) of each display element 304/media content instance, and/or any other suitable information associated with each display element 304 and/or media content instance. The ranked display elements 304 may then be positioned in accordance with the corresponding rankings. For example, display elements 304 with higher rankings may be positioned at the top and/or center of a group (e.g., stack or pile) of display elements 304 while display elements with lower rankings may be positioned at the bottom and/or outside of the group of display elements 304. Accordingly, a user may selectively navigate within a particular group of display elements 304 (e.g., navigate from the top down and/or from the center out) to discover and/or access media content of a desired relevance, popularity, and/or rating. In some examples, the relative positioning/ranking of display elements 304 within a group may dynamically change in accordance with changing user preferences, moods, and/or tendencies. In additional or alternative examples, groups of display elements 304 may be organized in any other suitable manner and/or in accordance with any other suitable information.

A group of display elements 304 may be further organized into one or more subgroups to further divide, refine, and/or filter the distribution of the display elements 304. In some examples, each subgroup may be associated with one or more corresponding distribution heuristics that govern which display elements 304 are included within the subgroup and/or their relative distribution within the subgroup. For example, a particular group may be associated with and include display elements 304 representative of a particular "genus" of media content and each subgroup may be associated with and include display elements 312 representative of media content from a particular "species" within the genus. To illustrate, a particular landmass of virtual world 302 may include (e.g., may be formed by) display elements 304 representative of newly-released movies. The particular landmass of virtual world 302 may be divided into one or more areas and/or include one or more topographical features (e.g., mountains, buildings, etc.) each including display elements 304 representative of media content associated with a particular media content characteristic. Accordingly, a user may selectively navigate to the particular landmass to discover newly-released movies and/or further navigate between the areas/topographical features of the particular landmass to discover newly-released movies associated with a desired media content characteristic (e.g., a desired genre or mood). In additional or alternative examples, a group of display elements 304 may be divided into any other suitable number of subgroups and/or in any other suitable manner.

The groups of display elements 304 and/or corresponding areas of virtual world 302 may be at least partially user configurable. For example, a user may selectively modify, create, and/or remove one or more areas of virtual world 302 and/or corresponding groups of display elements 304. To illustrate, a user may be interested in a particular sport (e.g., golf) and may create one or more distribution heuristics configured to group display elements 304 representative of media content instances associated with the particular sport (e.g., golfing events, instructional golfing videos, etc.) within a particular area of virtual world 302. Accordingly, the user may thereafter selectively navigate to the particular area/group of display elements 304 to discover and/or access media content associated with the particular sport. In some examples, a user may be allowed to configure the appearance (e.g., size, shape, etc.) of a particular group of display elements 304 and/or a particular area of virtual world 302. In additional or alternative examples, a user may be allowed to configure a group of display elements 304 and/or virtual world 302 in any other suitable manner.

As mentioned above, a user may utilize GUI 300 to navigate virtual world 302. For example, a user may utilize GUI 300 to selectively navigate around, through, and/or among display elements 304 to discover and/or access corresponding media content. In some examples, a user may further utilize GUI 300 to interact with display elements 304. For example, a user may utilize GUI 300 to interact with a particular display element 304 in order to move the particular display element 304 (e.g., from one position, group, and/or area within virtual world 302 to another), access information associated with a corresponding media content instance represented by the particular display element 304, experience (e.g., view) the corresponding media content instance, and/or remove the particular display element 304 from virtual world 302.

In some examples, a user may utilize GUI 300 and/or display elements 304 to access options (e.g., one or more selectable options presented individually, within one or more menus, and/or in any other suitable way) associated with the corresponding media content instances. These options may be configured to allow a user to perform any suitable actions associated with the corresponding media content instances. For example, the options may be configured to allow a user to access information (e.g., program guide information, ratings, descriptions, genres, and/or any other suitable information)

associated with the corresponding media content instances, experience (e.g., by way of one or more playback options) the corresponding media content instances, place the corresponding media content instances in a user's viewing queue, schedule the corresponding media content instances for recording, rate the corresponding media content instances, share the corresponding media content instances (e.g., with the user's social media contacts), communicate regarding the corresponding media content instances (e.g., by way of one or more social media outlets), access enhanced content (e.g., an advertisement, a website, interactive content, etc.) associated with the corresponding media content instances, and/or perform any other suitable actions associated with display elements 304 and/or the corresponding media content instances.

As shown in FIG. 3, virtual world 302 may include one or more virtual probes 306-1 and 306-2 (collectively referred to herein as "virtual probes 306"). Virtual probes 306 may be configured by a user to probe through virtual world 302 and attract/collect display elements 304 in accordance with one or more specified conditions. For example, rather than or in addition to manually navigating through virtual world 302 to discover display elements 304, a user may create a virtual probe 306 to automatically discover display elements 304 representative of media content instances that satisfy one or more user-inputted conditions. To illustrate, a user may create virtual probe 306-1 and configure virtual probe 306-1 to collect display elements 304 representative of media content instances associated with a particular rating (e.g., "Mature"), a particular genre (e.g., "Horror"), a particular mood (e.g., "Dark"), a particular keyword (e.g., "Vampire"), and/or any other suitable media content characteristic. Virtual probe 306-1 may then move throughout virtual world 302 and collect display elements 304 that are representative of media content instances that satisfy the specified conditions associated with virtual probe 306-1. The collected display elements 304 may then at least partially form virtual probe 306-1 (e.g., giving virtual probe 306-1 an appearance similar to a moon hovering over the surface of virtual world 302). In some examples, a user may then utilize virtual probe 306-1 to review the collected display elements 304 and/or access corresponding media content. In some examples, a collected display element 304 may remain within the corresponding virtual probe 306 for a predetermined amount of time (e.g., one or more minutes, hours, days, and/or weeks), after which the collected display element 304 may return to its place in virtual world 302 or may be removed from virtual world 302. In additional or alternative examples, a user may configure virtual probes 306 in any other suitable manner.

As further shown in FIG. 3, GUI 300 may include a personalized viewing interface 308 (or simply "interface 308"). In some examples, a user may utilize interface 308 to navigate virtual world 302, store one or more display elements 304 (e.g., for later viewing), and/or view one or more media content instances. For example, a user may utilize interface 308 as a virtual viewing queue, into which a user may move display elements 304 representative of media content instances that the user is interested in viewing at a later time. In additional or alternative examples, interface 308 may be configured in any other suitable manner and/or for any other suitable purpose.

In some examples, interface 308 may include one or more filters 310-1 through 310-4 (collectively referred to herein as "filters 310") that may be applied to interface 308. For example, a user may utilize filters 310 to selectively filter which display elements 304 are displayed in interface 308. To illustrate, a user may specify that she only wants to see display elements 304 representative of media content instances associated with a particular genre (e.g., "Comedy"), a particular mood (e.g., "Light"), a particular type of media content (e.g., "Movies"), a particular actor (e.g., "M. Myers"), and/or any other suitable media content characteristic. Accordingly, only display elements 304 representative of media content instances satisfying the conditions specified by way of filters 310 may be displayed in interface 308. In additional or alternative examples, filters 310 may be configured and/or utilized in any other suitable manner.

Interface 308 may additionally or alternatively include one or more selectable options 312-1 and 312-2 (collectively referred to herein as "selectable options 312") configured to allow a user to "Play" a particular media content instance represented by a selected display element 304 within interface 308 or "Play All" media content instances represented by the display elements 304 displayed in interface 308. In additional or alternative examples, interface 308 may include any other suitable options configured to allow a user to perform any other suitable actions by way of interface 308.

As further shown in FIG. 3, GUI 300 may include one or more selectable options 314-1 and 314-2 (collectively referred to herein as "selectable options 314") configured to allow a user to perform a "Keyword Search" of media content or create a "New Probe." Additionally or alternatively, GUI 300 may include any other suitable options configured to allow a user to perform any other suitable actions by way of GUI 300.

As mentioned above, detection facility 104 may be configured to detect one or more user interactions. As used herein, the term "user interaction" may include any suitable user commands, user inputs, user communications, interactions with media content, and/or any other suitable user interactions. Detection facility 104 may be configured to detect the user interactions in any suitable manner.

In some examples, detection facility 104 may be configured to detect one or more user interactions within GUI 300. For example, detection facility 104 may be configured to detect a navigation of GUI 300 by a user, an interaction with one or more of display elements 304 (e.g., a selection of one or more of display elements 304, a repositioning of one or more of display elements 304 within virtual world 302, etc.), a selection of one or more selectable options (e.g., one or more selectable options associated with a display element 304 or corresponding media content instance, selectable options 312, selectable options 314, etc.), an interaction with a media content instance (e.g., a playback of the media content instance), an interaction with a media content access device presenting GUI 300 (e.g., an interaction with an input device associated with the media content access device), a creation of one or more virtual probes 306, a creation or modification of one or more distribution heuristics, a creation or modification of one or more groups of display elements 304, and/or any other suitable interactions with GUI 300 and/or corresponding media content access devices.

In additional or alternative examples, the user interaction may include any other suitable interaction with any other suitable interface, software application, device, system, service provider, content (e.g., media content or enhanced content), database, and/or person. For example, the user interaction may comprise an interaction with a separate user interface (e.g., separate from GUI 300), a social media outlet (e.g., a posting provided by way of a social media outlet), a social media contact (e.g., a communication with a social media contact), a separate media content access device (e.g., separate from a media content access device presenting GUI 300, such as a separate set-top box device or mobile phone device), a media content instance (e.g., a viewing of a media content instance independent of GUI 300), a user profile (e.g., a modification of the user's profile or one or more user profiles associated with a user's social media contacts), and/or any other suitable device, software application, interface, database, system, service provider, content, and/or person.

In some examples, a detected user interaction may be an interaction of a user of GUI 300 (e.g., may be performed by the user, may originate from the user, etc.) or may be an interaction of one of the user's social media contacts. For example, a social media contact of a user may provide an interaction related to media content by way of a social media user interface, which may provide notification of the interaction to detection facility 104.

Detection facility 104 may be configured to obtain and/or maintain data representative of information associated with one or more user interactions. For example, detection facility 104 may be configured to monitor and/or track one or more user interactions, keep a record of the one or more user interactions, maintain data representative of content (e.g., communications) associated with the one or more user interactions, and/or maintain data representative of any other suitable information associated with the one or more user interactions. User interactions detected by detection facility 104 and/or corresponding information obtained by detection facility 104, may be utilized to personalize and/or customize a user's experience with GUI 300, as will be explained in more detail below.

As mentioned above, distribution facility 106 may be configured to adjust the distribution of display elements throughout a graphical representation of a virtual world. For example, distribution facility 106 may be configured to directly adjust the distribution of display elements 304 throughout virtual world 302. In some examples, distribution facility 106 may directly adjust (e.g., in response to a user interaction) the distribution of display elements 304 by moving one or more display elements 304 within virtual world 302 (e.g., by moving one or more display elements 304 from one group to another, repositioning one or more display elements 304 within a group, etc.). Accordingly, distribution facility 106 may allow a user to directly adjust the distribution of display elements 304 by, for example, manually moving (e.g., dragging) a particular display element 304 from one position to another.

Distribution facility 106 may be additionally or alternatively configured to adjust one or more distribution heuristics that govern the distribution of display elements 304 through virtual world 302. In some examples, distribution facility 106 may be configured to dynamically adjust the one or more distribution heuristics in accordance with and/or in response to one or more user interactions and/or corresponding information detected/obtained by detection facility 104. For example, distribution facility 106 may be configured to adjust the requirements of one or more distribution conditions specified by a distribution heuristic to alter the corresponding distribution of display elements 304. In some examples, distribution facility 106 may be configured to dynamically adjust the one or more distribution heuristics in accordance with a user's changing preferences, moods, media content viewing tendencies, etc. To illustrate, in response to a user's request to move a particular display element 304 from a first group of display elements 304 to a second group, distribution facility 106 may dynamically adjust one or more distribution heuristics associated with the two groups so that similar display elements 304 (e.g., display elements 304 representative of media content instances having similar characteristics) are more apt to be grouped into the second group and/or less apt to be grouped into or remain in the first group. To further illustrate, in response to a user's viewing of multiple media content instances associated with a particular genre or mood, distribution facility 106 may be configured to adjust one or more distribution heuristics to further facilitate the user's discovery and/or access of additional media content instances associated with the particular genre or mood.

The foregoing examples are provide for illustrative purposes only and are not limiting. In additional or alternative examples, distribution facility 106 may be configured to adjust the distribution of display elements 304 throughout virtual world 302 in any other suitable manner and/or in accordance with any other suitable information and/or user interactions. Accordingly, distribution facility 106 may be configured to dynamically personalize and/or customize a user's experience with GUI 300 and/or facilitate the self-learning configuration of one or more corresponding distribution heuristics.

As mentioned above, a user may be allowed to navigate within virtual world 302 in any suitable manner. In some examples, a user may zoom in on any portion of virtual world 302 to view and/or interact with corresponding display elements 304. To illustrate, as shown in FIG. 4, a user may navigate to and/or zoom in on group 400 of display elements 304. As shown in FIG. 4, as a user zooms in on a particular portion of virtual world 302, the user may be able to view corresponding display elements 304 in more detail. To further illustrate, FIG. 5 shows an exemplary view of GUI 300 being interacted with by a user 500 (e.g., by way of a touch screen). As shown in FIG. 5, a user may utilize GUI 300 to further zoom in on virtual world 302 and/or one or more display elements 304. In some examples, GUI 300 may be configured to provide a user with an experience simulating flying through and/or walking around virtual world 302 and/or display elements 304. Accordingly, a user may selectively navigate through virtual world 302 and/or display elements 304 until she discovers a display element 304 representative of a media content instance that is of interest to the user. Thereafter, the user may select to experience the media content instance (e.g., by way of GUI 300, by way of a separate media content device, such as a separate set-top box device associated with the user, and/or in any other suitable manner), add the media content instance to the user's viewing queue, schedule a recording of the media content instance, and/or perform any other suitable action associated with the media content instance.

As further shown in FIG. 5, some of display elements 304 may be suspended within virtual world 302 as if floating within virtual world 302. Additionally or alternatively, one or more of display elements 304 may be supported by one or more graphical columns connected to the display elements 304.

The exemplary views of FIGS. 3-5 are provided for illustrative purposes only and are not limiting. In additional or alternative examples, a user may navigate to and/or interact with any other suitable portion/area of virtual world 302 and/or in any other suitable manner.

Figure 6:
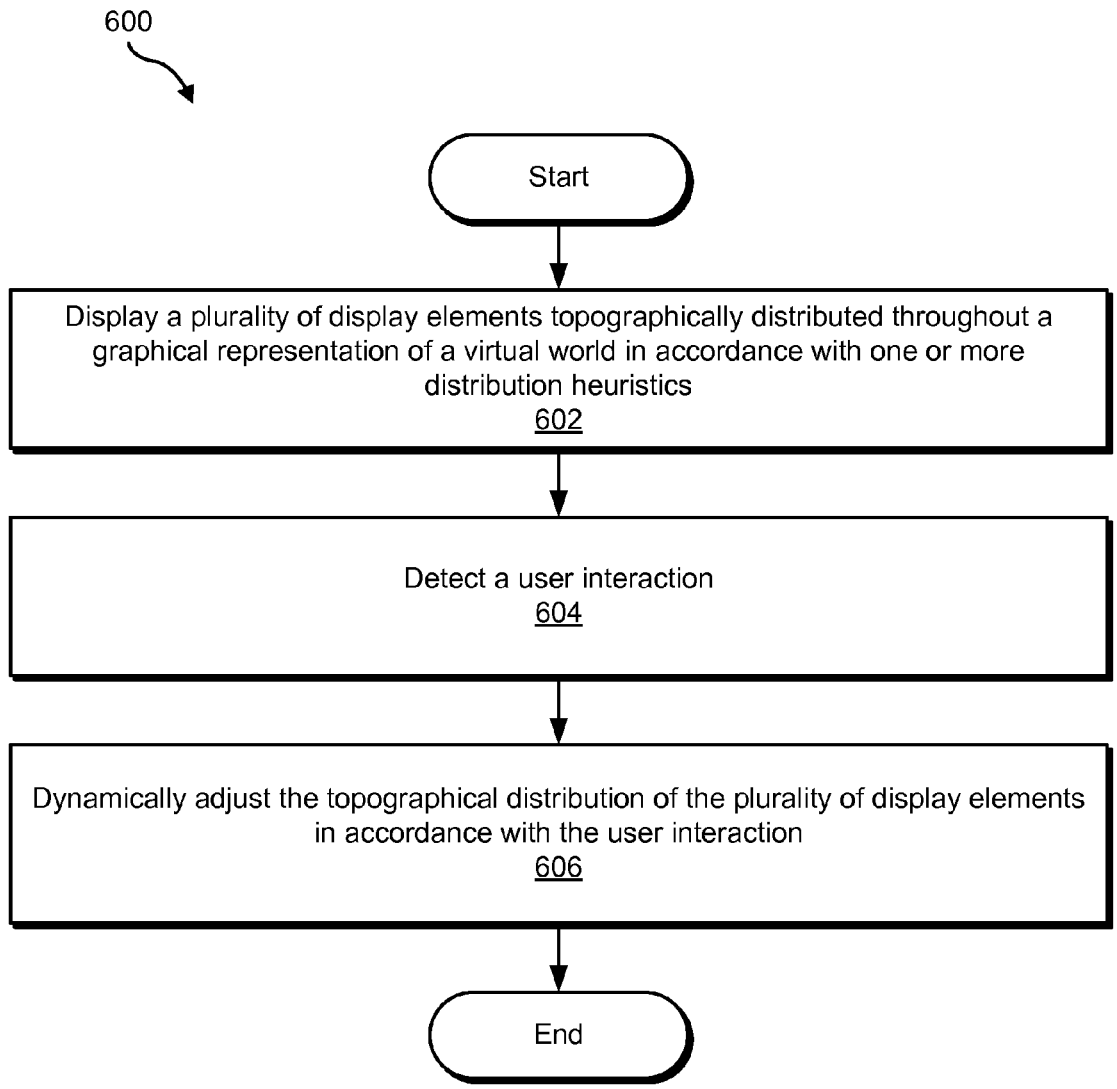
FIG. 6 illustrates an exemplary method for providing a media content user interface according to principles described herein.

FIG. 6 illustrates an exemplary method 600 for providing a media content user interface. While FIG. 6 illustrates exemplary steps according to one embodiment, other embodiments may omit, add to, reorder, and/or modify any of the steps shown in FIG. 6. One or more of the steps shown in FIG. 6 may be performed by any component or combination of components of system 100.

In step 602, a media content access subsystem displays a plurality of display elements topographically distributed throughout a graphical representation of a virtual world in accordance with one or more distribution heuristics. For example, display facility 102 may be configured to display the plurality of display elements in any suitable manner, such as described herein. In some examples, the plurality of display elements may be representative of a plurality of media content instances.

In step 604, the media content access subsystem detects a user interaction. For example, detection facility 104 may be configured to detect the user interaction in any suitable manner, such as described herein.

In step 606, the media content access subsystem dynamically adjusts the topographical distribution of the plurality of display elements in accordance with the user interaction. For example, distribution facility 106 may be configured to dynamically adjust the topographical distribution of the plurality of display elements in accordance with the user interaction in any suitable manner, such as described.

Figure 7:
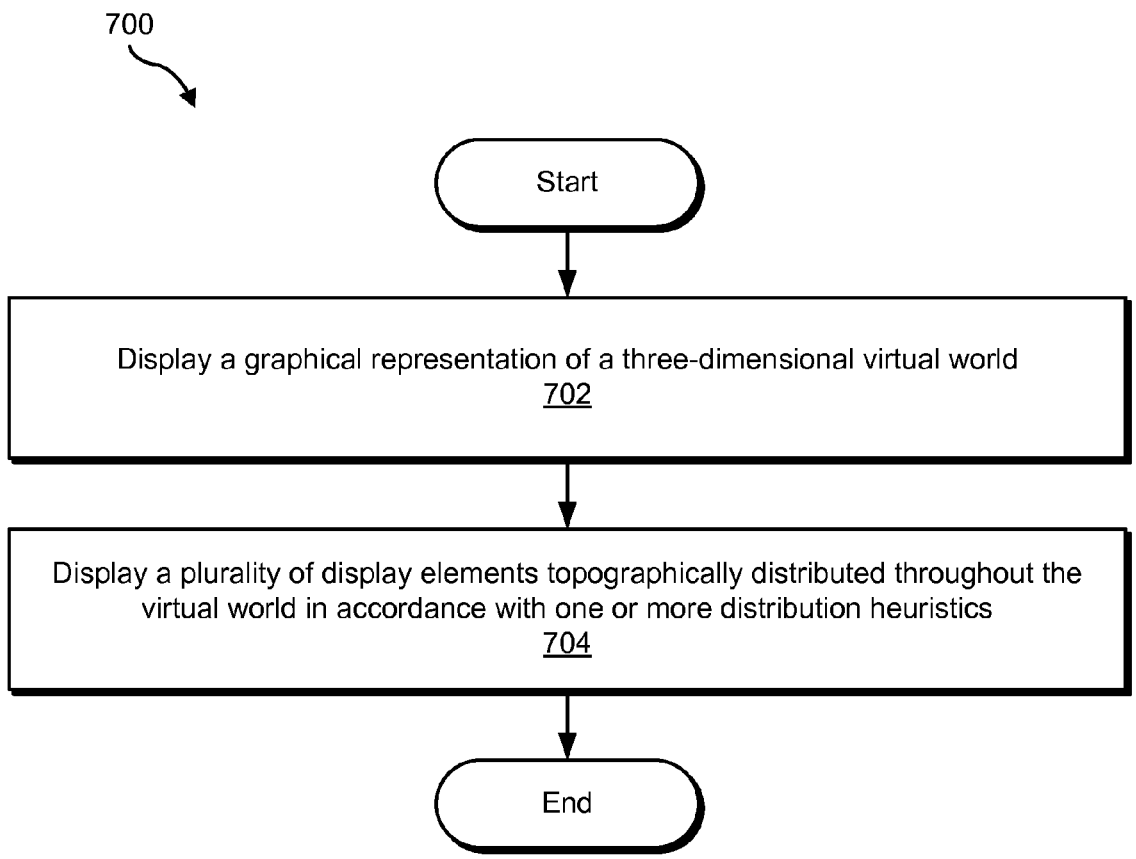
FIG. 7 illustrates another exemplary method for providing a media content user interface according to principles described herein.

FIG. 7 illustrates another exemplary method 700 for providing a media content user interface. While FIG. 7 illustrates exemplary steps according to one embodiment, other embodiments may omit, add to, reorder, and/or modify any of the steps shown in FIG. 7. One or more of the steps shown in FIG. 7 may be performed by any component or combination of components of system 100.

In step 702, a media content access subsystem displays a graphical representation of a three-dimensional virtual world. For example, display facility 102 may be configured to display the graphical representation of a three-dimensional virtual world in any suitable manner, such as described herein.

In step 704, the media content access subsystem displays a plurality of display elements topographically distributed throughout the virtual world in accordance with one or more distribution heuristics. For example, display facility 102 may be configured to display the plurality of display elements topographically distributed throughout the virtual world in any suitable manner, such as described herein. In some examples, the plurality of display elements may be representative of a plurality of media content instances. Additionally or alternatively, the one or more distribution heuristics may be configured to facilitate discovery by a user of at least one media content instance within the plurality of media content instances in a personalized manner.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 8:
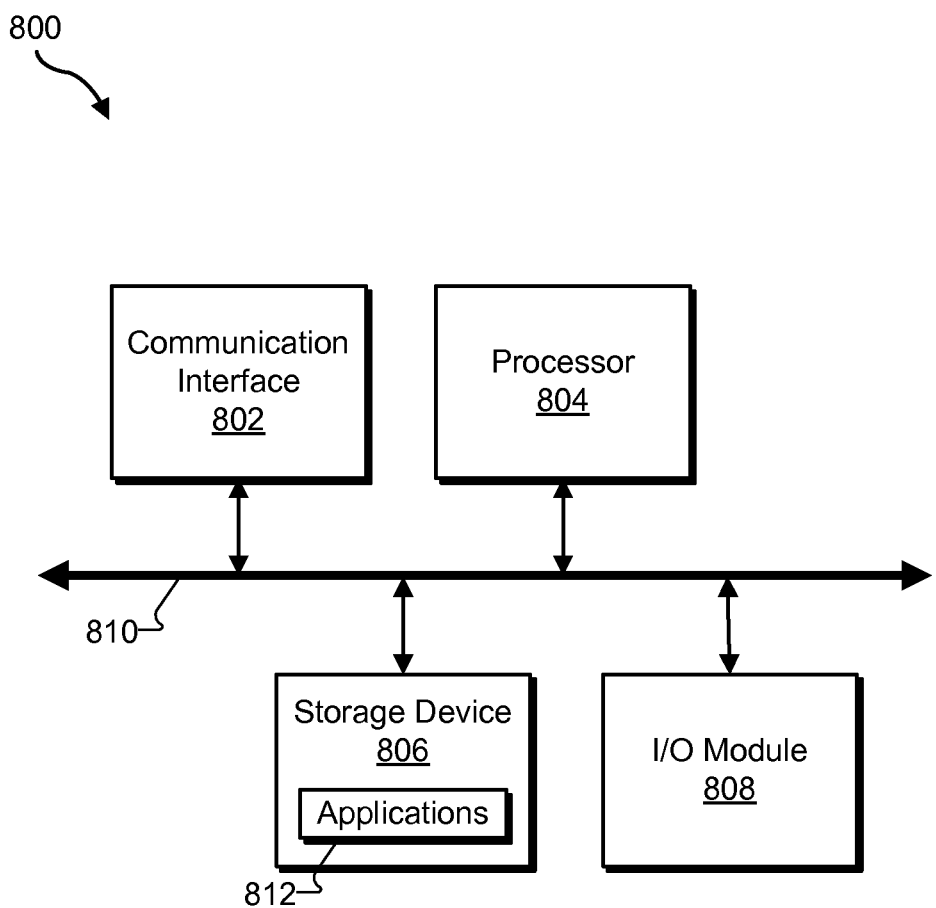
FIG. 8 illustrates an exemplary computing device according to principles described herein.

FIG. 8 illustrates an exemplary computing device 800 that may be configured to perform one or more of the processes described herein. As shown in FIG. 8, computing device 800 may include a communication interface 802, a processor 804, a storage device 806, and an input/output ("I/O") module 808 communicatively connected via a communication infrastructure 810. While an exemplary computing device 800 is shown in FIG. 8, the components illustrated in FIG. 8 are not intended to be limiting. Additional or alternative components may be used in other embodiments. Components of computing device 800 shown in FIG. 8 will now be described in additional detail.

Communication interface 802 may be configured to communicate with one or more computing devices. Examples of communication interface 802 include, without limitation, a wired network interface (such as a network interface card), a wireless network interface (such as a wireless network interface card), a modem, and any other suitable interface. In at least one embodiment, communication interface 802 may provide a direct connection between system 100 and one or more provisioning systems via a direct link to a network, such as the Internet. Communication interface 802 may additionally or alternatively provide such a connection through, for example, a local area network (such as an Ethernet network), a personal area network, a telephone or cable network, a satellite data connection, a dedicated URL, or any other suitable connection. Communication interface 802 may be configured to interface with any suitable communication media, protocols, and formats, including any of those mentioned above.

Processor 804 generally represents any type or form of processing unit capable of processing data or interpreting, executing, and/or directing execution of one or more of the instructions, processes, and/or operations described herein. Processor 804 may direct execution of operations in accordance with one or more applications 812 or other computer-executable instructions such as may be stored in storage device 806 or another computer-readable medium.

Storage device 806 may include one or more data storage media, devices, or configurations and may employ any type, form, and combination of data storage media and/or device. For example, storage device 806 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 806. For example, data representative of one or more executable applications 812 (which may include, but are not limited to, one or more of the software applications described herein) configured to direct processor 804 to perform any of the operations described herein may be stored within storage device 806. In some examples, data may be arranged in one or more databases residing within storage device 806.

I/O module 808 may be configured to receive user input and provide user output and may include any hardware, firmware, software, or combination thereof supportive of input and output capabilities. For example, I/O module 808 may include hardware and/or software for capturing user input, including, but not limited to, a keyboard or keypad, a touch screen component (e.g., touch screen display), a receiver (e.g., an RF or infrared receiver), and/or one or more input buttons.

I/O module 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 808 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 800. For example, one or more applications 812 residing within storage device 806 may be configured to direct processor 804 to perform one or more processes or functions associated with display facility 102, detection facility 104, and/or distribution facility 106. Likewise, storage facility 108 may be implemented by or within storage device 806.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising: displaying, by a media content access subsystem by way of a graphical user interface, a plurality of display elements topographically distributed throughout a graphical representation of a virtual world in accordance with one or more distribution heuristics, wherein each of the plurality of display elements is representative of one of a plurality of media content instances, and wherein the topographical distribution of the plurality of display elements forms one or more topographical features within the virtual world; detecting, by the media content access subsystem, a user interaction; and dynamically adjusting, by the media content access subsystem, the topographical distribution of the plurality of display elements to update a graphical representation of a virtual probe that automatically discovers and graphically attracts one or more of the plurality of display elements from the graphical representation of the virtual world in accordance with one or more conditions specified by the user interaction.

2. The method of claim 1, wherein the one or more topographical features comprise at least one of a natural topographical feature and a man-made topographical feature.

3. The method of claim 1, wherein the one or more topographical features comprise at least one of one or more mountains, one or more buildings, and one or more landmasses.

4. The method of claim 1, wherein the virtual world comprises one or more areas, wherein the one or more distribution heuristics are configured to govern which display elements within the plurality of display elements are included in each of the one or more areas.

5. The method of claim 1, wherein each topographical feature within the one or more topographical features is formed by one or more groups of display elements from the plurality of display elements.

6. The method of claim 5, wherein each topographical feature within the one or more topographical features is associated with at least one of the one or more distribution heuristics configured to govern which display elements within the plurality of display elements are included in the one or more groups of display elements that form the topographical feature.

7. The method of claim 1, wherein the one or more distribution heuristics are configured to govern a position of each display element within the plurality of display elements within the virtual world.

8. The method of claim 1, wherein the topographical distribution of the plurality of display elements comprises a selective positioning of each display element within the plurality of display elements such that the plurality of display elements collectively form the one or more topographical features.

9. The method of claim 1, wherein each distribution heuristic within the one or more distribution heuristics specifies one or more distribution conditions configured to govern the topographical distribution of one or more of the plurality of display elements.

10. The method of claim 1, wherein the virtual world is at least partially three-dimensional.

11. The method of claim 1, wherein the virtual world is user navigable by way of the graphical user interface.

12. The method of claim 1, wherein the media content access subsystem comprises a tablet computer including a touch screen.

13. The method of claim 1, wherein the one or more distribution heuristics comprise at least one of a predefined distribution heuristic, a user-defined distribution heuristic, and a self-learning distribution heuristic.

14. The method of claim 1, wherein the user interaction is associated with at least one of the graphical user interface, a particular media content instance within the plurality of media content instances, an input device associated with the media content access subsystem, a particular display element within the plurality of display elements, a social media contact, and the media content access subsystem.

15. The method of claim 1, further comprising displaying, by the media content access subsystem by way of the graphical user interface, a personalized viewing interface in conjunction with the virtual world.

16. The method of claim 1, further comprising displaying, by the media content access subsystem, one or more selectable options associated with at least one of a particular media content instance within the plurality of media content instances and a particular display element within the plurality of display elements, wherein the one or more selectable options comprise at least one of an option to present the particular media content instance, an option to access information associated with the particular media content instance, an option to rate the particular media content instance, an option to place the particular media content instance in a queue, an option to schedule a recording of the particular media content instance, an option to access enhanced content associated with the particular media content instance, and an option to move the particular display element.

17. The method of claim 1, wherein the dynamically adjusting the topographical distribution comprises repositioning a particular display element within the graphical representation of the virtual world.

18. The method of claim 1, embodied as computer-executable instructions on at least one non-transitory computer-readable medium.

19. A method comprising: displaying, by a media content access subsystem by way of a graphical user interface, a graphical representation of a three-dimensional virtual world; displaying, by the media content access subsystem by way of the graphical user interface, a plurality of display elements topographically distributed throughout the virtual world in accordance with one or more distribution heuristics, wherein the plurality of display elements are representative of a plurality of media content instances, wherein the topographical distribution of the plurality of display elements forms one or more topographical features within the virtual world, and wherein the one or more distribution heuristics are configured to facilitate discovery by a user of at least one media content instance within the plurality of media content instances in a personalized manner; and updating, by the media content access subsystem by way of the graphical user interface, a graphical representation of a virtual probe that automatically discovers and graphically attracts one or more of the plurality of display elements from the virtual world in accordance with one or more specified conditions.

20. The method of claim 19, embodied as computer-executable instructions on at least one non-transitory computer-readable medium.

21. A system comprising: a display facility configured to display, by way of a graphical user interface, a plurality of display elements topographically distributed throughout a graphical representation of a virtual world in accordance with one or more distribution heuristics, wherein each of the plurality of display elements is representative of one of a plurality of media content instances, and wherein the topographical distribution of the plurality of display elements forms one or more topographical features within the virtual world; a detection facility communicatively coupled to the display facility and configured to detect a user interaction; and a distribution facility communicatively coupled to the detection facility and configured to dynamically adjust the topographical distribution of the plurality of display elements to update a graphical representation of a virtual probe that automatically discovers and graphically attracts one or more of the plurality of display elements from the graphical representation of the virtual world in accordance with one or more conditions specified by the user interaction.

22. The method of claim 1, wherein the dynamically adjusting the topographical distribution comprises forming the graphical representation of the virtual probe at least partially from the one or more of the plurality of display elements graphically attracted from the graphical representation of the virtual world such that the graphical representation of the virtual probe has an appearance similar to a moon hovering over a surface of the graphical representation of the virtual world.

23. The method of claim 1, wherein the user interaction comprises a keyword search performed by a user.

24. The method of claim 1, wherein the dynamically adjusting of the topographical distribution comprises moving the graphical representation of the virtual probe throughout the graphical representation of the virtual world to graphically attract the one or more of the plurality of display elements that represent one or more of the plurality of media content instances that satisfy the one or more conditions specified by the user interaction.

25. The method of claim 1, wherein the virtual probe is at least partially made up of the one or more of the plurality of display elements.

* * * * *